(12) United States Patent
Tsunematsu

(10) Patent No.: US 8,687,895 B2
(45) Date of Patent: Apr. 1, 2014

(54) IMAGE PROCESSING APPARATUS, IMAGE PROCESSING METHOD, AND COMPUTER-READABLE MEDIUM

(75) Inventor: Yuichi Tsunematsu, Kowloon (HK)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 13/246,315

(22) Filed: Sep. 27, 2011

(65) Prior Publication Data

US 2012/0093401 A1    Apr. 19, 2012

(30) Foreign Application Priority Data

Oct. 18, 2010    (JP) ................................. 2010-234012

(51) Int. Cl.
*G06K 9/40*    (2006.01)

(52) U.S. Cl.
USPC ............................. 382/199; 382/266; 382/274

(58) Field of Classification Search
USPC ......... 382/199, 197, 165, 162, 164, 242, 266, 382/202, 274, 181, 190, 195, 254, 232; 345/418, 419, 443, 441, 421, 582; 358/500, 518, 530
See application file for complete search history.

(56) References Cited

U.S. PATENT DOCUMENTS

| | | | | |
|---|---|---|---|---|
| 5,016,001 A | * | 5/1991 | Minagawa et al. | 345/442 |
| 6,151,424 A | * | 11/2000 | Hsu | 382/294 |
| 6,287,765 B1 | * | 9/2001 | Cubicciotti | 435/6.11 |
| 6,333,993 B1 | * | 12/2001 | Sakamoto | 382/173 |
| 8,041,122 B2 | * | 10/2011 | Ishida et al. | 382/197 |
| 2008/0137961 A1 | | 6/2008 | Ishida et al. | |
| 2011/0229026 A1 | | 9/2011 | Tsunematsu | |

FOREIGN PATENT DOCUMENTS

| | | |
|---|---|---|
| JP | 3026592 B | 3/2000 |
| JP | 2006-031245 A | 2/2006 |
| JP | 2008-146496 A | 6/2008 |
| JP | 4378208 B | 12/2009 |

OTHER PUBLICATIONS

Toriwaki, "Digital image processing for image understanding (2)", third impression of first edition, ISBN4-7856-2004-8, Shokodo, Apr. 20, 1993, pp. 66-79.

* cited by examiner

*Primary Examiner* — Sheela Chawan
(74) *Attorney, Agent, or Firm* — Fitzpatrick, Cella, Harper & Scinto

(57) ABSTRACT

An apparatus comprises: a contour extraction unit configured to extract contours of color regions, each of which includes continuous pixels having the same pixel value, in image data; an intersection detection unit configured to detect, as an intersection, a point in each of contours extracted by the contour extraction unit; a division boundary line storage unit configured to store, in association with a contour in which the intersection is detected by the intersection detection unit, contours divided at the intersection as boundary lines; a non-division boundary line storage unit configured to store, in association with a contour in which the intersection is not detected by the intersection detection unit, the contour as a boundary line without dividing the contour; a function approximation unit configured to execute function approximation for each of boundary lines stored by the division boundary line storage unit and the non-division boundary line storage unit.

13 Claims, 10 Drawing Sheets

BEFORE FUNCTION APPROXIMATION

AFTER FUNCTION APPROXIMATION

FIG. 9

| LINE NUMBER | END POINT COORDINATE (START POINT, END POINT) | | DIRECTION FROM START POINT | COORDINATE POINT SEQUENCE |
|---|---|---|---|---|
| 1 | (1, 1) | (1, 1) | RIGHT | (1, 1), (6, 1), (6, 5), (3, 5), (3, 4), (1, 4), (1, 1) |
| 2 | (4, 3) | (4, 3) | LEFT | (4, 3), (2, 3), (2, 2), (4, 2), (4, 3) |
| 3 | (4, 3) | (4, 3) | RIGHT | (4, 3), (5, 3), (5, 4), (4, 4), (4, 3) |
| 4 | (4, 8) | (5, 7) | LEFT | (4, 8), (2, 8), (2, 7), (3, 7), (3, 6), (5, 6), (5, 7) |
| 5 | (4, 8) | (5, 7) | UPPER | (4, 8), (4, 7), (5, 7) |
| 6 | (4, 8) | (5, 7) | RIGHT | (4, 8), (6, 8), (6, 7), (5, 7) |

FIG. 10

| REGION NUMBER | LINE NUMBER |
|---|---|
| 1 | LINE 1, LINE 2 (REVERSE SEQUENCE), LINE 3 (REVERSE SEQUENCE) |
| 2 | LINE 2, LINE 3 |
| 3 | LINE 4, LINE 5 (REVERSE SEQUENCE) |
| 4 | LINE 6 (REVERSE SEQUENCE), LINE 5 |

FIG. 11

| LINE NUMBER | COORDINATE POINT SEQUENCE | APPROXIMATION RESULT |
|---|---|---|
| 1 | (1, 1), (6, 1), (6, 5), (3, 5), (3, 4), (1, 4), (1, 1) | L(1, 1), L(6, 1), L(6, 5), C1(3, 5), C2(3, 4), L(1, 4), Z |
| 2 | (4, 3), (2, 3), (2, 2), (4, 2), (4, 3) | L(4, 3), L(2, 3), L(2, 2), L(4, 2), L(4, 3) |
| 3 | (4, 3), (5, 3), (5, 4), (4, 4), (4, 3) | L(4, 3), L(5, 3), L(5, 4), L(4, 4), L(4, 3) |
| 4 | (4, 8), (2, 8), (2, 7), (3, 7), (3, 6), (5, 6), (5, 7) | L(4, 8), L(2, 8), C1(2, 7), C2(3, 7), L(3, 6), L(5, 6), L(5, 7) |
| 5 | (4, 8), (4, 7), (5, 7) | L(4, 8), L(4, 7), L(5, 7) |
| 6 | (4, 8), (6, 8), (6, 7), (5, 7) | L(4, 8), L(6, 8), L(6, 7), L(5, 7) |

BEFORE FUNCTION APPROXIMATION

AFTER FUNCTION APPROXIMATION

IMAGE PROCESSING APPARATUS, IMAGE PROCESSING METHOD, AND COMPUTER-READABLE MEDIUM

BACKGROUND OF THE INVENTION

1. Field of the Invention

The present invention relates to an image processing apparatus, image processing method, computer-readable medium, which vectorize an image and, more particularly, to an image processing method which implements vectorization to be free from any gaps between color regions by extracting boundary lines between color regions from contour information of the color regions (regions each of which includes pixels that can be considered as the same color), and reconstructing original color regions after function approximation of the boundary lines.

2. Description of the Related Art

As techniques associated with vectorization of images, a contour information extraction method and coordinate point sequence function approximation method have been proposed in addition to methods for characters. Furthermore, targets are broadened to general illustration images, and techniques for applying vectorization processing to various types of images such as vectorization for line images, and that for color images have been proposed.

Vectorized data allows smooth contour expression free from any jaggies when it is zoomed to a desired size. For an illustration image and the like, vectorization also has a data size reduction effect, and allows, for example, easy edit processing in a computer. Most of images such as characters and line images can be handled as binary images or single-color images (those in which characters and line parts are defined by a single color, and a remaining part corresponds to a white background). For these images, when contours extracted for respective color-connection regions (those of characters and line images) undergo function approximation, a preferred vectorization result can be obtained. Note that a color-connection region (color region) is a region that includes connected pixels determined to have the same color (that in which same color pixels are connected). However, most of illustrations include many colors, and how to handle boundary lines between a plurality of color regions poses a problem. When contours of color regions detected from a multi-color image undergo function approximation in the same manner as in the processing for a binary image, the contours of respective neighboring color regions are individually approximated. In this case, two approximate curves are obtained for a common boundary line part between neighboring color regions due to approximation errors, and gaps and overlaps are often generated. FIGS. 3A and 3B show this state. FIG. 3A shows an example in which contour shapes of respective color regions are extracted from an input image. Assuming that a region of a white background part is not counted, there are three color regions which neighbor other color regions (which have boundary lines with other regions). FIG. 3B shows a processing result obtained when contour information shown in FIG. 3A individually undergoes function approximation for each color region, and gaps and an overlap are generated between the color regions.

A vectorization method which prevents gaps from being generated between color regions based on the aforementioned problem has also been proposed. For example, in Japanese Patent Laid-Open No. 2006-031245, a boundary between pixels having a given color difference or more is tracked as a contour, a point where pixels of three or more colors meet is selected as a branch point, and partial contours for respective branch points are extracted. To have a partial contour as a processing unit of function approximation, data after the function approximation are connected again to generate vector data, thus applying a common function approximation result to boundary lines.

In Japanese Patent Laid-Open No. 2008-146496, an image is scanned in a horizontal direction, vertical direction, and oblique direction to extract boundary pixels, and region numbers which neighbor at respective boundaries are stored. Then, boundary pixel coordinates and region numbers which neighbor at respective boundary pixels, which are detected upon scanning in the horizontal direction, are stored in a horizontal direction boundary point table. Also, a vertical direction boundary point table and oblique direction boundary point table are similarly generated for the vertical direction and oblique direction. Of boundary points which are included in at least two or more tables of the three tables, a point where combinations of neighboring region numbers on the two or more tables do not perfectly match is selected as an intersection. That is, in Japanese Patent Laid-Open No. 2008-146496 as well, a boundary point where three or more color regions meet is selected as an intersection. An extracted intersection of color regions is used as an end point, and a contour coordinate point sequence which connects between end points is generated as a boundary line. After the boundary lines undergo function approximation, data after the function approximation are connected again to generate vector data. In this processing as well, a common function approximation result is applied to the boundary lines as in Japanese Patent Laid-Open No. 2006-031245.

In general, there are two concepts of a connection state between pixels in image data. The first connection state is the concept of 4-neighboring connection (4-connectivity) in which pixels in four directions, that is, upper, lower, right, and left directions are scanned to have a pixel of interest as a center, and when a pixel having a pixel value of the same color is found, it is determined that the pixel of interest and the pixel of the same color are connected. The second connection state is the concept of 8-neighboring connection (8-connectivity) in which pixels in eight directions, that is, upper, lower, right, left, and oblique directions are scanned to have a pixel of interest as a center, and when a pixel having a pixel value of the same color is found, it is determined that the pixel is connected to the pixel of interest. That is, as for a position where the pixels of the same colors neighbor in only the oblique directions, it is determined that these pixels are not connected since the oblique directions are not scanned in the 4-neighboring connection concept. On the other hand, based on the 8-neighboring connection concept, even when pixels of the same colors neighbor in only the oblique directions, it is determined that they are connected. Hence, these pixels are handled as one pixel group (the same color region).

FIG. 4 shows an image which includes pixels of two colors, that is, white and gray, and includes a position where pixels of the same colors are connected in the oblique directions. In this case, respective contours are extracted as follows by applying the 8-neighboring connection concept to white and gray regions. For example, assume that an inside contour of a gray region and outside contours of white regions included in the gray region are to be extracted, and respective contour extraction processes progress in the direction of the solid arrow. At this time, the next extraction direction to progress includes two directions, that is, upper and lower directions from an intersection. When an inside contour of the gray region is to be extracted based on the 8-neighboring connection concept, since it is considered that gray pixels which neighbor in an oblique direction are connected, an upper direction is set as the next extraction direction. On the other hand, when an outside contour of the white region is to be extracted based on the 8-neighboring connection concept, since it is considered that white pixels which neighbor obliquely are connected, a lower direction is set as the extraction direction. That is, even when either an outside or inside contour is to be extracted based on the 8-neighboring connection concept, although the gray and white regions have a common boundary, the contour extraction direction unwantedly changes. Hence, contour shapes extracted finally do not match.

In the example of FIG. 4, two inside contours of the gray region are extracted based on the 8-neighboring connection concept. Also, when an outside contour of the white region is extracted based on the 8-neighboring connection concept, since contour extraction progresses while determining that neighboring positions in the oblique direction are connected, one outside contour is extracted. In this manner, when the two inside contours of the gray region and one outside contour of the white region, which are extracted in this way, respectively undergo function approximation, different function approximation results are obtained, thus causing gaps and overlaps.

On the other hand, in Japanese Patent Laid-Open No. 2006-031245, since a point where pixels of three or more colors meet is selected as a branch point, a position where pixels of the same colors neighbor in the oblique directions, as shown in FIG. 4, is not considered as a branch point since there are only two colors.

The method disclosed by Japanese Patent Laid-Open No. 2008-146496 handles pixel positions themselves as a coordinate point sequence in place of a contour of pixels. Hence, a boundary line of a thin line having a 1-pixel width cannot be correctly extracted. Furthermore, in Japanese Patent Laid-Open No. 2008-146496, a point where combinations of region numbers stored in the boundary point tables do not match (that is, a point where regions of three colors meet) is selected as an intersection. Therefore, in Japanese Patent Laid-Open No. 2008-146496 as well, a position where pixels of the same colors neighbor in the oblique directions, as shown in FIG. 4, is not considered as an intersection since there are only two colors.

Therefore, even when the techniques of Japanese Patent Laid-Open Nos. 2006-031245 and 2008-146496 are used, a contour is not divided at a position where pixels of the same colors neighbor in only the oblique directions, as shown in FIG. 4, gaps and overlaps are generated when boundary lines of contours undergo function approximation.

SUMMARY OF THE INVENTION

According to one aspect of the present invention, there is provided an image processing apparatus comprising: a contour extraction unit configured to extract contours of color regions, each of which includes continuous pixels having the same pixel value, in image data; an intersection detection unit configured to detect, as an intersection, a point which satisfies one of a point at which not less than three different colors meet, and a point at which pixels which neighbor in oblique directions have the same color and pixels which neighbor in right and left directions and in upper and lower directions have different colors, in each of contours extracted by the contour extraction unit; a division boundary line storage unit configured to store, in association with a contour in which the intersection is detected by the intersection detection unit, contours divided at the intersection as boundary lines; a non-division boundary line storage unit configured to store, in association with a contour in which the intersection is not detected by the intersection detection unit, the contour as a boundary line without dividing the contour; a function approximation unit configured to execute function approximation for each of boundary lines stored by the division boundary line storage unit and the non-division boundary line storage unit; and a boundary line connection unit configured to reconstruct contours of the color regions using the boundary lines after the function approximation of the function approximation unit.

According to another aspect of the present invention, there is provided an image processing apparatus comprising: a region number assigning unit configured to assign region numbers to color regions, each of which includes connected pixels having the same pixel value, in image data; a contour extraction unit configured to extract contours of the color regions assigned the region numbers by specifying coordinate point sequences which define the contours; an intersection detection unit configured to inspect positions of the contours extracted by the contour extraction unit, using a window having a 2×2 pixel size in an image assigned the region numbers by the region number assigning unit, and detects, as an intersection, one of a position at which not less than three different region numbers exist within the window, and a position at which only region numbers in oblique directions in the window are the same; a boundary line extraction unit configured to extract, in association with a contour in which the intersection is detected by the intersection detection unit, contours divided at the intersection as boundary lines, and extracts a contour in which the intersection is not detected by the intersection detection unit as a boundary line without dividing the contour; a function approximation unit configured to execute function approximation for each of boundary lines extracted by the boundary line extraction unit; and a boundary line connection unit configured to reconstruct the contours of the color regions by connecting the boundary lines after the function approximation of the function approximation unit.

According to another aspect of the present invention, there is provided an image processing method comprising: a contour extraction step of extracting contours of color regions, each of which includes continuous pixels having the same pixel value, in image data; an intersection detection step of detecting, as an intersection, a point which satisfies one of a point at which not less than three different colors meet, and a point at which pixels which neighbor in oblique directions have the same color and pixels which neighbor in right and left directions and in upper and lower directions have different colors, in each of contours extracted in the contour extraction step; a division boundary line storage step of storing, in association with a contour in which the intersection is detected in the intersection detection step, contours divided at the intersection as boundary lines; a non-division boundary line storage step of storing, in association with a contour in which the intersection is not detected in the intersection detection step, the contour as a boundary line without dividing the contour; a function approximation step of executing function approximation for each of boundary lines stored in the division boundary line storage step and the non-division boundary line storage step; and a boundary line connection step of reconstructing contours of the color regions using the boundary lines after the function approximation in the function approximation step.

According to another aspect of the present invention, there is provided a computer-readable medium storing a program for controlling a computer to function as: a contour extraction unit configured to extract contours of color regions, each of which includes continuous pixels having the same pixel value, in image data; an intersection detection unit configured to detect, as an intersection, a point which satisfies one of a point at which not less than three different colors meet, and a point at which pixels which neighbor in oblique directions have the same color and pixels which neighbor in right and left directions and in upper and lower directions have different colors, in each of contours extracted by the contour extraction unit; a division boundary line storage unit configured to store, in association with a contour in which the intersection is detected by the intersection detection unit, contours divided at the intersection as boundary lines; a non-division boundary line storage unit configured to store, in association with a contour in which the intersection is not detected by the intersection detection unit, the contour as a boundary line without dividing the contour; a function approximation unit configured to execute function approximation for each of boundary lines stored by the division boundary line storage unit and the non-division boundary line storage unit; and a boundary line connection unit configured to reconstruct contours of the color regions using the boundary lines after the function approximation of the function approximation unit.

According to the present invention, contours of color regions (boundary lines between color regions) can be extracted compatibly. Thus, even when function approximation is applied to boundary lines, neither gaps nor overlaps are generated, and a vectorization processing result free from any jaggies even after enlargement or reduction can be obtained.

Further features of the present invention will become apparent from the following description of exemplary embodiments (with reference to the attached drawings).

BRIEF DESCRIPTION OF THE DRAWINGS

FIG. 9 is a table for explaining information held by the extracted boundary lines;

FIG. 10 is a table for explaining region reconstruction information;

FIG. 11 is a table showing function approximation results of the boundary lines shown in FIG. 9.

DESCRIPTION OF THE EMBODIMENTS <First Embodiment>

An embodiment of the present invention will be described hereinafter with reference to the accompanying drawings. However, components described in this embodiment are merely examples, and the technical scope of the present invention is settled by the scope of claims, but it is not limited by the following individual embodiments.

Hardware Arrangement

Figure 2:
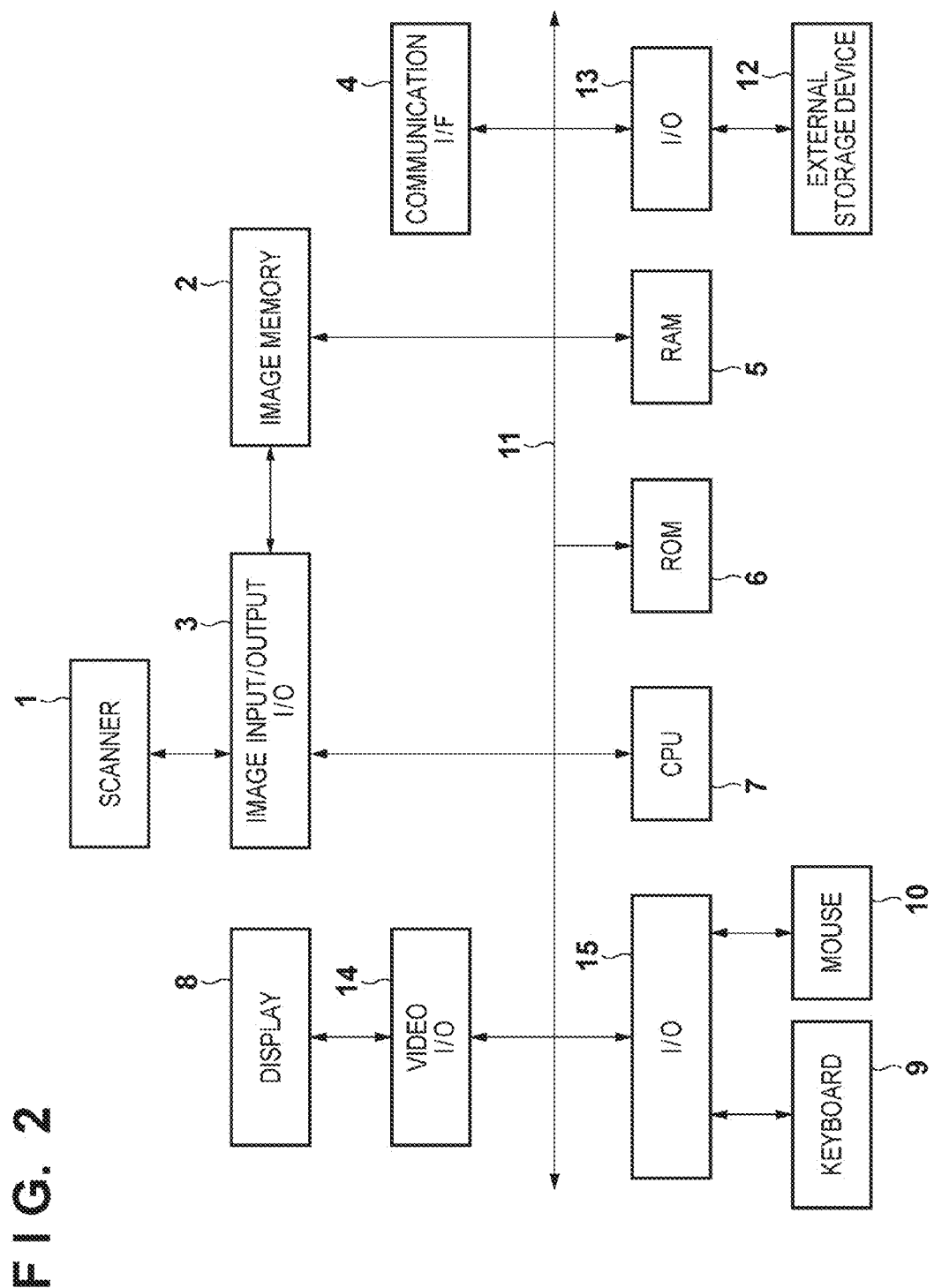
FIG. 2 is a block diagram of the information processing apparatus according to the embodiment.

An arrangement example of an image processing apparatus of this embodiment will be described below with reference to the block diagram shown in FIG. 2. Referring to FIG. 2, a CPU (Central Processing Unit) 7 controls the overall apparatus. A ROM (Read Only Memory) 6 stores programs and parameters which do not require any changes. A RAM (Random Access Memory) 5 temporarily stores programs and data supplied from an external apparatus or the like. A scanner 1 obtains digital image data by photoelectrically scanning a document and the like. An image input/output I/O 3 connects the scanner 1 and image processing apparatus. An image memory 2 holds image data scanned by the scanner 1.

An external storage device 12 includes a hard disk or memory card which is fixedly mounted, or removable magnetic and optical disks such as a flexible disk (FD) and Compact Disk (CD), magnetic and optical cards, IC cards, memory cards, and the like. An I/O 13 is that between these external storage devices 12 and image processing apparatus. An I/O 15 is that with input devices such as a pointing device 10 (for example, a mouse) and a keyboard 9, which accept user's operations and input data. A video I/O 14 is that with a display monitor 8 used to display data held by the image processing apparatus and supplied data. A communication I/F 4 is that required to connect a network line such as the Internet. A system bus 11 connects the respective units which configure the image processing apparatus to be able to communicate with each other.

Processing Sequence

Figure 1:
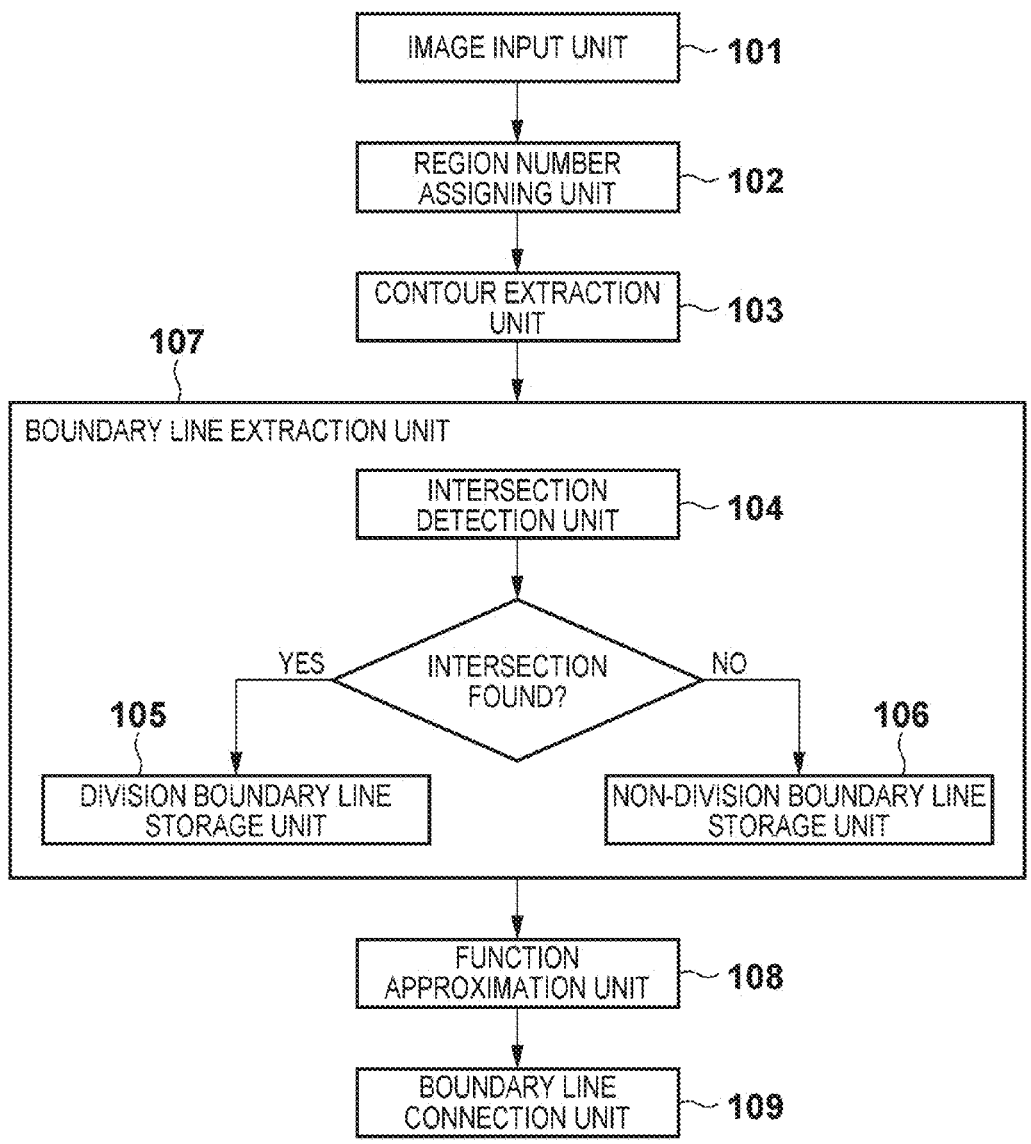
FIG. 1 is a block diagram of main processing of an information processing apparatus according to an embodiment.
Figure 5:
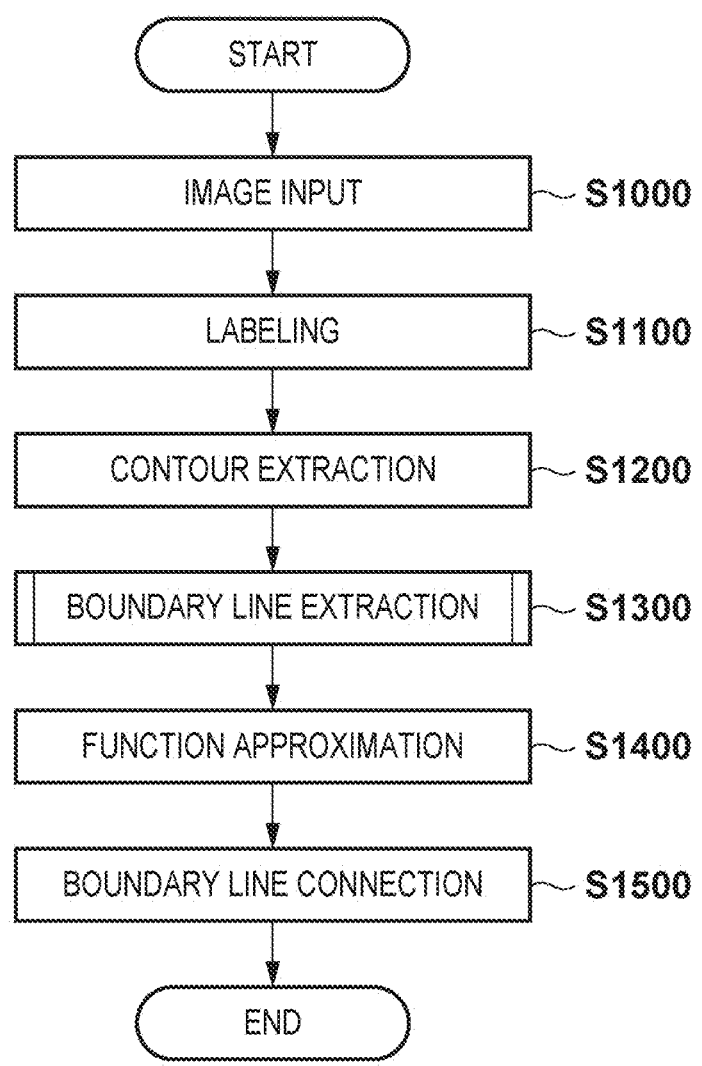
FIG. 5 is a flowchart according to the embodiment.

The processing sequence for implementing the present invention when the CPU 7 executes programs will be described below with reference to the block diagram shown in FIG. 1 and the flowchart shown in FIG. 5. The programs are required to control a computer to function as respective units shown in FIG. 1. Note that the present invention is not limited to implementation of the respective units shown in FIG. 1 when the computer executes software programs, but some or all of the units shown in FIG. 1 may be implemented by hardware such as electronic circuits.

When the processing starts in step S1000, the CPU 7 controls to input image data including an image region to be processed. The image region in this case is a region of continuous pixels having pixel values of the same color. As for image input, image data scanned by the scanner 1 is input to the image memory 2 via the image input/output I/O 3. Alternatively, image data including the image region to be processed may be input from outside the image processing apparatus via the communication I/F 4, or image data stored in advance in the external storage device 12 may be loaded via the I/O 13. The obtained input image is held on the image memory 2.

Note that when the input unit such as the scanner is used, noise is superposed on the input image, and it is often difficult to specify a representative color. In this case, it is desirable to apply color-reduction processing to combine pixels having close pixel values to have the same color information. In step S1000, the CPU 7 applies the color-reduction processing to the input image to solve the aforementioned problem. As the color-reduction processing to be applied in this step, arbitrary methods can be used as long as the present invention is applicable. For example, in a method disclosed in Japanese Patent Laid-Open No. 2006-344069, clusters are formed from pixels in an input image based on color information, and similar clusters and those which are considered as noise are combined to remove scan noise. In this embodiment, noise generated upon inputting a scan image is removed by applying such method. The aforementioned processing in step S1000 is implemented by an image input unit 101 shown in FIG. 1.

In step S1100, the CPU 7 executes labeling processing to extract color regions in the image data. The labeling processing assigns the same number to a set of pixels which neighbor (are connected) in the upper, lower, right, left, and oblique directions and have the same pixel value based on the 8-neighboring connection concept, and is normally used as pre-processing for acquiring information (area, shape) of each region. In this case, a number required to identify each color region in subsequent processing (to be referred to as a region number hereinafter) is assigned to pixels included in each color region. The image which has undergone the labeling processing (region number (label) assigning processing) will be referred to as a labeling image hereinafter. The labeling processing has to be executed to have the same connection state as that in contour extraction processing to be executed later. Since this embodiment will give the following description using an example of contour extraction based on the 8-neighboring connection concept, the labeling processing is also executed based on the 8-neighboring connection concept to assign the same number to a set of pixels which neighbor in the upper, lower, right, left, and oblique directions and have the same pixel value. Note that the processing in step S1100 is implemented by a region number assigning unit 102 shown in FIG. 1.

In step S1200, the CPU 7 extracts coordinates which define contours of respective color regions extracted from the image data (to be referred to as contour coordinates hereinafter). The CPU 7 selects, in sequence, a region number, contour coordinates of which are not extracted yet, and executes contour extraction processing for each color region of the selected region number as a region to be processed, thereby extracting contour coordinates of each color region. In this case, a contour extraction method disclosed by Japanese Patent No. 3026592 is applied. Note that when the contour extraction method of Japanese Patent No. 3026592 is applied, contour coordinates (coordinate values of a contour vector) are extracted as a binary image in which a pixel value of a color region of the selected region number is "1" (figure pixel) and that of the remaining region is "0" (background pixel). Assume that contour coordinates are detected based on the 8-neighboring connection concept in this embodiment. The CPU 7 starts a raster scan from an upper left position of a binary image indicating a color region of the selected region number, and creates a table which stores coordinates of contours in the horizontal and vertical directions.

After that, the CPU 7 generates contour information based on the created contour coordinate table. Since the contour extraction processing is executed for each connected region (connected color region), contours to be obtained include one outside contour and 0 or more inside contours. That is, when the outside contour is preferentially extracted, subsequent contours to be extracted can be handled as inside contours, and a tracking direction during contour extraction can be easily specified. When the CPU 7 repetitively executes the aforementioned processing until no non-extracted region number remains, contour information can be extracted for all the color regions.

In step S1200, the contour extraction processing by a raster scan using a 3×3 pixel matrix as in Japanese Patent No. 3026592 has been exemplified. However, the present invention is not limited to this, and contour tracking type contour extraction processing may be executed. The contour tracking type contour extraction processing is a method of extracting a contour by inspecting contour pixels in a sequence along the contour. Since the contour tracking type contour extraction processing also extracts one outside contour by necessity, when an outside contour is preferentially extracted, subsequent contours to be extracted can be handled as inside contours. For example, Toriwaki, "Digital image processing for image understanding (2)", third impression of first edition, ISBN4-7856-2004-8, SHOKODO, Apr. 20, 1993, pp. 66-79 discloses a tracking type contour extraction method. As tracking methods, a pixel tracking type which tracks pixels, a side tracking type which tracks sides, and a vertex tracking type which tracks vertices are introduced. When the vertex tracking type contour extraction processing is executed, the same processing result as in Japanese Patent No. 3026592 can be obtained. Outside and inside contours can be distinguished from each other by searching for a start point of a first contour to be tracked from an end of an image by a raster scan. Qualitatively, an outside contour is located outside an inside contour, and is surely detected first in a raster scan. Also, the identification result in the labeling processing ensures one outside contour. Hence, a contour line extracted first can be handled as an outside contour, and subsequently extracted contours can be considered as inside contours. Note that the two methods have been explained as examples of extracting contours of color regions. However, other methods may be used. The contour extraction processing in step S1200 is implemented by a contour extraction unit 103 shown in FIG. 1.

Figure 6:
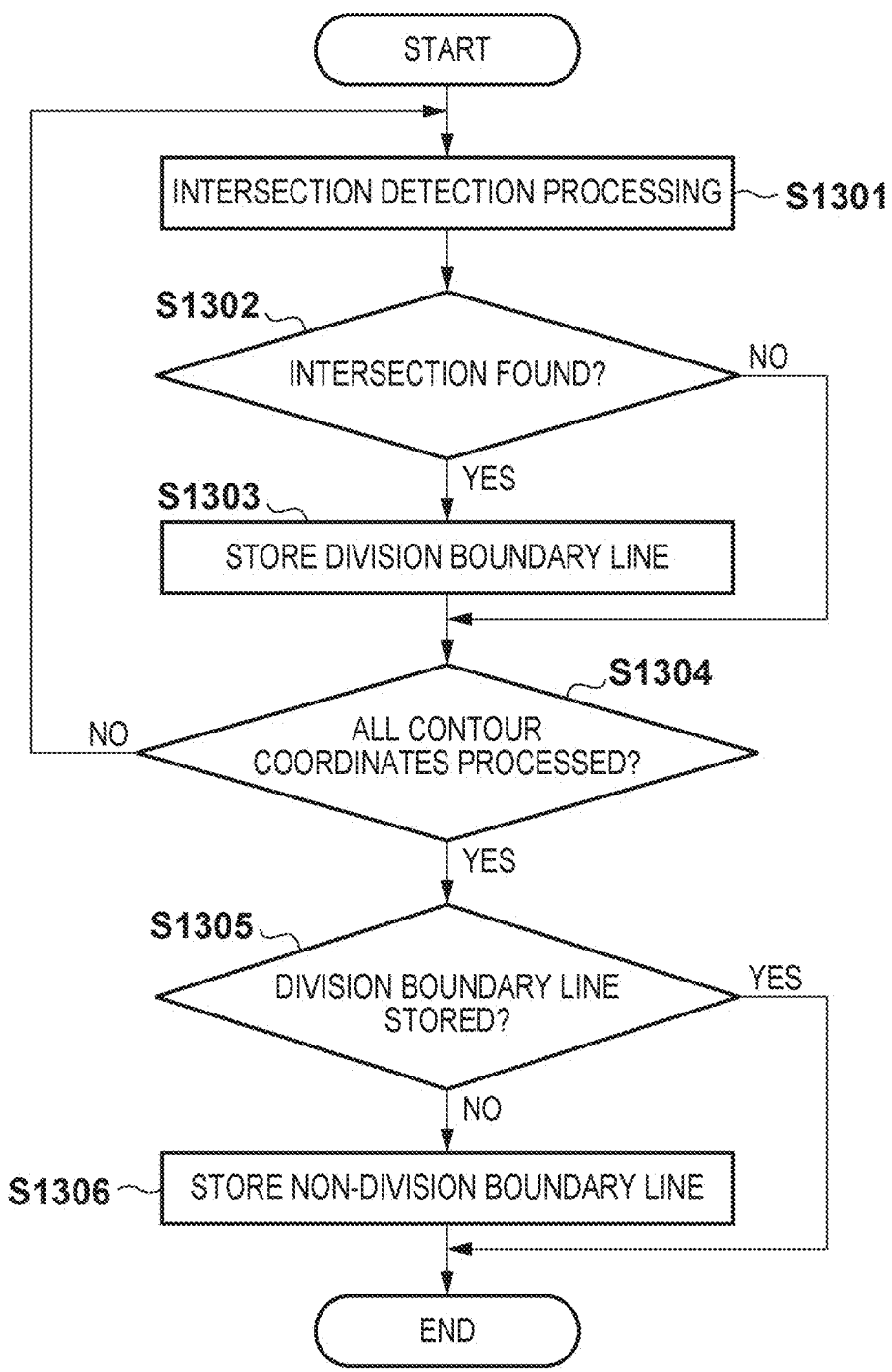
FIG. 6 is a flowchart of boundary line extraction processing.
Figure 7:
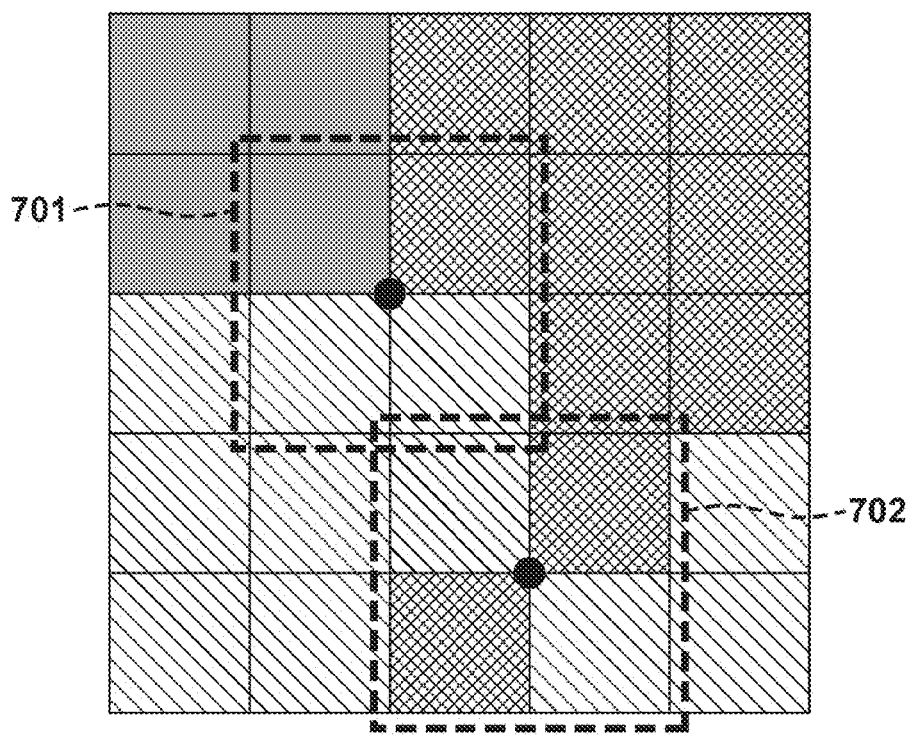
FIG. 7 is a view for explaining conditions for intersections to be detected.

In step S1300, the CPU 7 extracts a boundary line between neighboring intersections of color regions based on the contour coordinates extracted in step S1200. That is, since each contour is divided into sections between neighboring intersections, one or more boundary lines are extracted from the contour of each color region extracted in step S1200. A detailed sequence of step S1300 will be described below with reference to FIG. 6. In the boundary line extraction processing, the CPU 7 refers to labeling processing results of positions corresponding to contour coordinates so as to detect an intersection between color regions. In step S1301, the CPU 7 detects an intersection using a window having a 2×2 pixel size. Note that in step S1301, the labeling image (that in which region numbers of color regions are assigned to respective pixels) after the labeling processing in step S1100 can undergo inspection using the window having the 2×2 pixel size. Furthermore, the intersection detection processing can be efficiently done by applying the inspection using the window to contour positions detected in step S1200 (those indicated by contour coordinates). That is, the entire labeling image need not be inspected using the window. An intersection judgment method will be described below with reference to FIG. 7.

In this embodiment, two conditions are defined to judge an intersection, that is, an intersection is judged (1) when the window having the 2×2 pixel size includes three or more different colors (color regions) like a window 701 or (2) when pixels which neighbor in oblique directions of a plurality of pixels included in the window have the same color (color regions) like in a window 702 (that is, when only the region numbers of pixels in the oblique directions in the window are the same). In case of (2) above, color regions (pixels) in the oblique directions have the same color, but color regions which neighbor in the upper and lower directions and in the right and left directions are different color regions. At this time, two colors contact an intersection. Note that the reason why case (2) is judged as an intersection is that if the same boundary line extraction method is applied to outside and inside contours of a color region, when neighboring pixel groups are included in only the oblique directions, the shapes of the outside and inside contours are unwantedly changed, and different approximation results are obtained when function approximation is executed. Since it becomes difficult to identify boundary lines required in the subsequent processing, and it is also considered that positions which neighbor in only the oblique directions in (2) are disconnected, it is standardized that boundary lines divided at respective intersections are extracted. In this way, boundary line identification processing can be easily executed. The intersection detection processing in step S1301 is implemented by an intersection detection unit 104 shown in FIG. 1.

If an intersection is detected in step S1301 (YES in step S1302), the CPU 7 stores a division boundary line in step S1303. That is, the division boundary line is a line segment which is defined by a contour coordinate point sequence that exists between a first intersection (start point) and a second intersection (end point) of the extracted intersections. Note that when one contour includes only one intersection, it is determined that the start and end points have the same coordinates, and a line segment defined by a contour coordinate point sequence having that intersection as the start and end points is stored. Information stored for the division boundary line will be described below using an example of FIG. 9. Note that the information shown in FIG. 9 is stored in a storage unit such as the RAM 6. For one boundary line, a line number required to identify that line, end point coordinates including those of the start and end points, a direction from the start point to the next point, and coordinate point sequence information of contour coordinates between the end points are held. When boundary lines are extracted based on contours extracted from all color regions, each boundary line is extracted twice. This is because each boundary line contacts both of two color regions.

For boundary lines expressed by the same coordinate point sequence, the same information has to be referred to when function approximation results are connected in subsequent processing. Hence, in order to efficiently confirm whether or not a detected boundary line is not that which has already been extracted in this processing, an upper left point of an image to be processed is set as an origin. Then, the CPU 7 selects an intersection which is located at an upper leftmost position as a start point in each boundary line, and stores connection information from the start point to the next point together.

Figure 8:
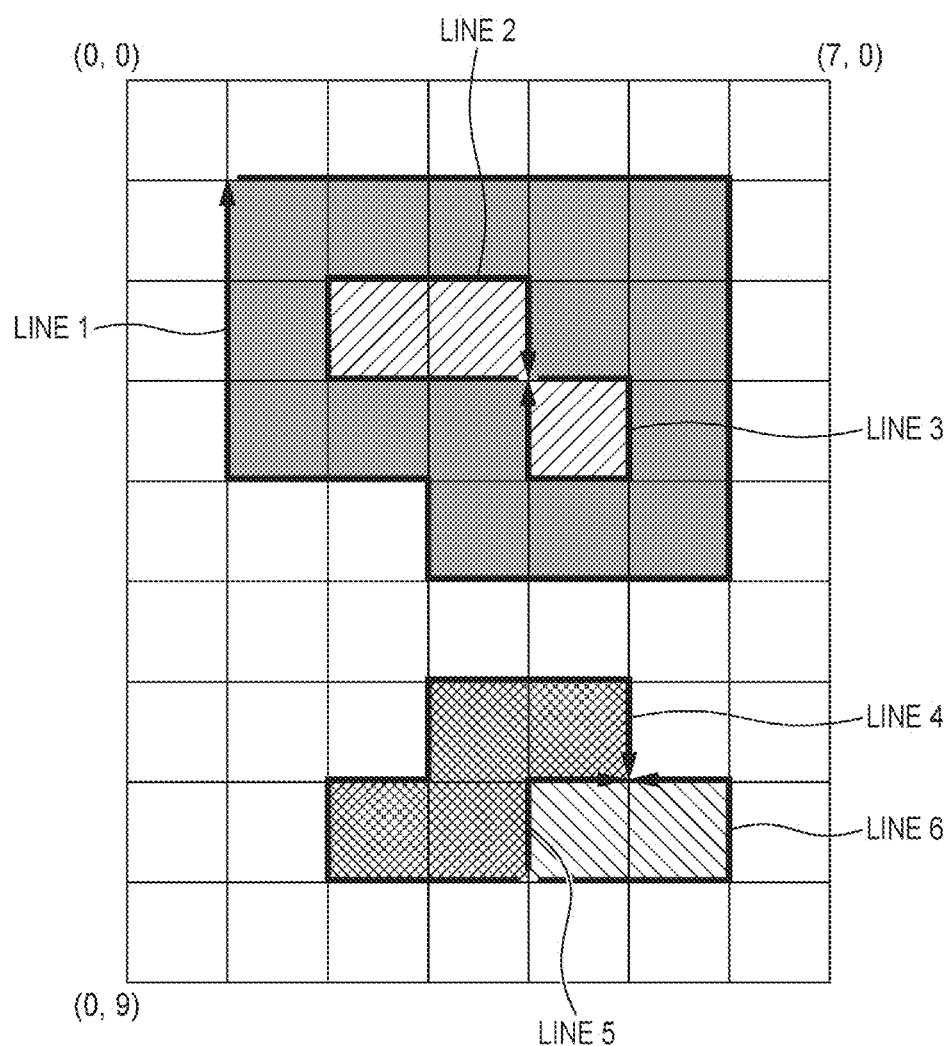
FIG. 8 is a view for explaining extracted boundary lines.

For example, in FIG. 8, three boundary lines, that is, lines 4, 5, and 6 exist between coordinates (4, 8) and coordinates (5, 7) extracted as intersections. Upon detection of a boundary line (division boundary line) which connects these intersections, the coordinates (5, 7) may be detected first as an intersection of color regions, and the coordinates (4, 8) may be detected later. In this case, the horizontal coordinates ("4" and "5" in this case) of the coordinates (4, 8) and coordinates (5, 7) are compared, and the coordinates are sorted so that the coordinates (4, 8) having a smaller value is set as a start point. When the horizontal coordinate values are equal to each other, coordinates having a smaller vertical coordinate value is selected as a start point. The start and end points of lines 4, 5, and 6 match, but directions from the start point to the next coordinates are different like left, upper, and right. That is, a boundary line can be identified by combining three parameters, that is, the start and end points and the direction from the start point. Also, in each boundary line, a coordinate point sequence of contour coordinates from the start point to the end point is stored together. For example, since line 5 is defined by three points, the CPU 7 stores [(4, 8), (4, 7), (5, 7)] as a coordinate point sequence. When a boundary line which has the same start and end points and the same direction from the start point as those of a boundary line which has already been stored in FIG. 9 is found, it is determined that the boundary line has already been stored, and that boundary line is not stored in FIG. 9 redundantly.

When the start and end points are the same, coordinate information is stored clockwise. Both lines 2 and 3 have the same start and end points, that is, coordinates (4, 3). In this case, the CPU 7 stores these lines in the RAM 6, so that each coordinate point sequence is sorted clockwise with reference to the coordinates (4, 3). Line 2 has a left direction as a direction from the start point to the next point, and line 3 has a right direction as a direction from the start point to the next point. Hence, these lines can be identified from each other. In this case as well, the CPU 7 stores sorted values of the coordinate point sequence in the RAM 6 together. For example, since line 2 is defined by five points, the CPU 7 stores a coordinate point sequence [(4, 3), (2, 3), (2, 2), (4, 2), (4, 3)]. FIG. 9 summarizes boundary line information to be stored in association with lines 2, 3, 4, 5, and 6.

With this devise, upon judging whether or not a coordinate point sequence which is sorted to have a predetermined sequence has already been extracted, boundary lines can be uniquely compared using the coordinates of the start and end points and the direction from the start point to the next point. Note that selection of a point which is located at an upper leftmost position as a start point is an example, and other criteria may be applied as a predetermined criterion as long as the same criterion is consistently adopted in the processing.

Since the extracted boundary lines have to be connected in subsequent processing, information of a connection relationship between boundary lines (to be referred to as region reconstruction information hereinafter) required upon connecting the lines is held. FIG. 10 shows an example of the region reconstruction information. When the CPU 7 stores line numbers of extracted boundary lines in turn in the RAM 6, information required to reconstruct a region can be obtained. When an extracted boundary line has already been extracted, the CPU 7 stores a boundary line number which has been extracted earlier and has already been stored instead. Since information is held by replacing the positions of the start and end points for some boundary lines, when boundary lines are to be connected in a reverse sequence at the time of reconstruction, that information is stored together. Note that "reverse sequence" in this case indicates that a coordinate point sequence of a boundary line which is extracted for each color region and coordinate points of which are stored in a predetermined sequence is specified in a sequence reverse to that sequence. When a boundary line of "reverse sequence" is included at the time of reconstruction of a color region, boundary lines of that color region can be reconstructed by specifying the coordinate point sequence of the stored boundary lines in a reverse sequence. Note that "normal sequence" is described as an expression having a meaning opposite to "reverse sequence". This indicates an original sequence of a stored coordinate point sequence, as shown in FIG. 9.

Taking extraction of color regions in a lower portion of FIG. 8 as an example, when boundary lines are extracted based on contours of region number 3, line 4 can be extracted first, and line 5 can then be extracted as "reverse sequence" (counterclockwise) with reference to the coordinates (4, 8). Hence, [line 4, line 5 (reverse sequence)] is stored as region reconstruction information of region number 3. Next, when boundary lines are extracted based on contours of region number 4, line 6 can be extracted as "reverse sequence", and line 5 can then be extracted to have a normal sequence. Hence, as shown in FIG. 10, [line 6 (reverse sequence), line 5] is stored as region reconstruction information of region number 4. The acquisition processing of the region reconstruction information is implemented by a division boundary line storage unit 105 shown in FIG. 1.

The CPU 7 determines in step S1304 whether or not the intersection detection processing is complete for all the contour coordinates. If contour coordinates to be processed still remain (NO in step S1304), the process returns to step S1301 to continue the intersection detection processing. If all the contour coordinates have been processed (YES in step S1304), the process advances to step S1305 to determine whether or not the division boundary line storage processing in step S1303 is complete for all contours. Depending on boundaries, no intersection of color regions is detected. This is the case when a color region to be extracted is included in another color region located outside that color region. For example, an outside contour of region number 1 shown in FIG. 8 corresponds to such region. If a contour which is not stored as a division boundary line remains (NO in step S1305), that contour line is saved as a non-division boundary line (line 1 in FIG. 9) without dividing the contour line in step S1306.

When a non-division boundary line is stored, since whether or not that boundary line has already been extracted has to be judged later, it is desired to sort a coordinate point sequence. In this case, the CPU 7 selects a point which is located at an upper leftmost point of contour coordinates as a start point, and stores a coordinate point sequence in the RAM 6 to standardize a sequence, so that the coordinate point sequence surrounds a region clockwise. A contour corresponding to an outside contour of region number 1 in FIG. 8 is defined by six points. Of these points, coordinates having a smallest horizontal coordinate value include two coordinates (1, 1) and (1, 4). In this case, the CPU 7 selects the coordinates (1, 1) having a smallest value in the vertical direction as a start point to be stored, and stores a coordinate point sequence clockwise. As a result, as line 1 in FIG. 9, the coordinates (1, 1) as start and end points, right as a direction from the start point, and a coordinate point sequence [(1, 1), (6, 1), (6, 5), (3, 5), (3, 4), (1, 4), (1, 1)] are stored in the RAM 6. Note that the criterion which sorts the coordinate point sequence clockwise to have a point located at the upper leftmost position as a start point is an example, and other criteria may be applied as long as the same criterion is consistently adopted in the processing.

In step S1306, information indicating a relationship between a non-division boundary line and region number is added to region reconstruction information shown in FIG. 10. As the region reconstruction information at this time, as for a region including outside and inside contours, an outside contour is stored first. As a result, the region reconstruction information of region number 1 is stored as [line 1, line 2, line 3], as shown in FIG. 10. Step S1306 is implemented by a non-division boundary line storage unit 106 shown in FIG. 1.

Since the boundary line extraction processing is applied to contour coordinates extracted from all color regions, boundary lines can be extracted without any omissions and contradictions. The aforementioned processes described in steps S1301 to S1306 are implemented by a boundary line extraction unit 107 shown in FIG. 1.

In step S1400, the CPU 7 applies function approximation to coordinate point sequences of respective boundary lines (division and non-division boundary lines) extracted in step S1300. Note that the function approximation is executed so that curves after approximation pass positions of intersections detected by the intersection detection unit, thereby connecting divided boundary lines with each other. This embodiment attains the function approximation by further dividing a coordinate point sequence of each boundary line at a point (salient point and inflection point), which satisfies any of the following conditions, and fitting a Bezier curve to each divided section.

First salient point: a point where a change in vector which connects neighboring point sequence makes an acute angle Second salient point: points at two ends when a distance between continuous points is larger than a certain threshold Inflection point: a point where a sign of an outer product of continuous vectors changes As described above, as a function approximation method using Bezier curves, a method described in Japanese Patent No. 4378208 can be used.

FIG. 11 shows approximation results of the boundary lines shown in FIG. 9 using straight lines and cubic Bezier curves. The approximation results respectively indicate end point coordinates (L), a control point (C), and a closed curve (Z) of a straight line or Bezier curve. This processing is implemented by a function approximation unit 108 shown in FIG. 1. Of course, the function approximation method of each boundary line described in this embodiment is an example, and other function approximation methods may be used. Note that information shown in FIG. 11 is stored in a storage unit such as the RAM 6.

Finally, in step S1500 the CPU 7 reconstructs curve information of the boundary lines approximated in step S1400, and outputs the reconstructed information as vector data. In this case, the function approximation results of the respective boundary lines are connected according to the region reconstruction information shown in FIG. 10 to obtain vector data indicating contours of respective color regions. Note that even when the function approximation results are used in a reverse sequence, a shape of a curve to be drawn remains unchanged. For this reason, when the region reconstruction information indicates a connection in a reverse sequence, the function approximation results can be used intact in the reverse sequence.

For example, the region reconstruction information of region number 1 is configured by lines 1, 2, and 3. Since line 1 is a non-division boundary line which defines an outside contour of region 1, other lines 2 and 3 are inside contours. Since the start and end points of lines 2 and 3 are the same coordinates, these lines are connected as one inside contour. Hence, the approximation result of the outside contour corresponding to region number 1 is [L(1, 1), L(6, 1), L(6, 5), C(3, 5), C(3, 4), L(1, 4), Z]. Also, the approximation result of the inside contour is [L(4, 3), L(2, 3), L(2, 2), L(4, 2), L(4, 3), L(5, 3), L(5, 4), L(4, 4), Z]. The aforementioned processing is implemented by a boundary line connection unit 109 shown in FIG. 1. That is, the boundary line connection unit 109 executes contour reconstruction processing which reconstructs contours of respective color regions using boundary lines after function approximation.

Figure 3A:
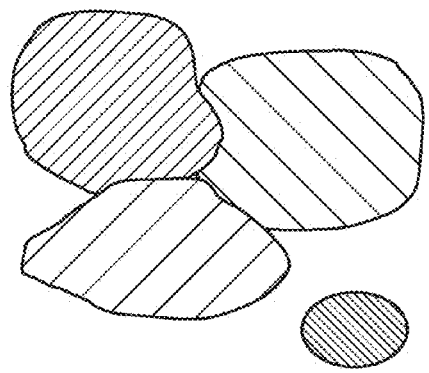
FIGS. 3A and 3B are views for explaining an example in which color regions suffer overlaps and gaps as a result of the conventional function approximation.
Figure 3B:
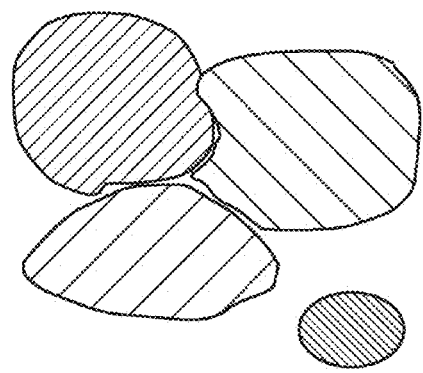
Figure 12A:
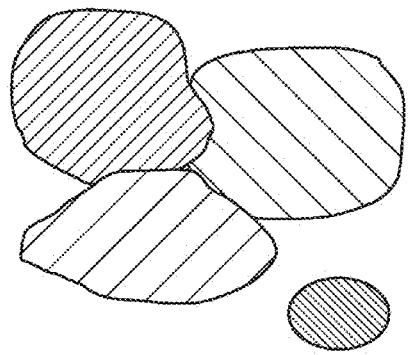
FIGS. 12A and 12B are views showing vector data free from any gaps or overlaps, which is obtained as a result of a method of the present invention.
Figure 12B:
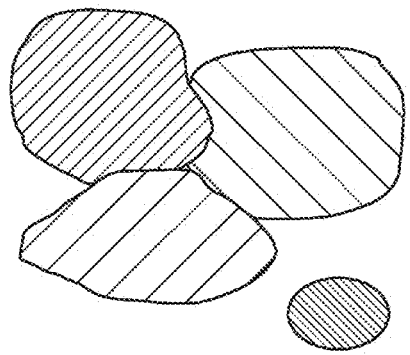

FIGS. 12A and 12B show the processing result for input data based on the aforementioned processes. As shown in FIGS. 12A and 12B, neighboring positions of the respective color regions are converted into vector data free from any overlaps or gaps, as compared to FIGS. 3A and 3B.

As described above, according to this embodiment, since it is guaranteed that common approximation results can be used for boundaries of color regions by processing for a position where color regions of three or more colors meet and a position where the same color regions exist in the oblique directions, vector data free from any overlaps or gaps between color regions can be obtained. <Second Embodiment>

In the first embodiment, after the contour coordinates of all the color regions are extracted in step S1200, the boundary lines are extracted in step S1300. In the second embodiment, every time contour coordinates are extracted from each color region, boundary lines are extracted in turn. That is, the two processes in steps S1200 and S1300 need not be separated, and the extraction processing of boundary lines (division and non-division boundary lines) may be executed as soon as the contour extraction processing for each color region is complete. With this method, the same processing result as in the first embodiment can be obtained. <Third Embodiment>

In the first and second embodiments, processing for extracting contours in the order of an outside contour and inside contour is repeated for respective color regions. In the third embodiment, outside contours of all color regions are extracted first, intersections are detected in association with the extracted outside contours of the respective color regions, and boundary lines (division and non-division boundary lines) based on the outside contours are stored. After that, inside contours of the respective color regions are extracted, intersections are detected in association with the extracted inside contours to obtain boundary lines (division and non-division boundary lines) based on the inside contours, and it is then determined whether or not each boundary line based on the inside contour matches any of the already stored boundary lines based on the outside contours.

All boundary lines assume roles of both outside and inside contours in image data. That is, when all boundary lines obtained based on outside contours of color regions are stored first, since boundary lines obtained based on inside contours have already been stored, their matches need only be determined.

Thus, the same effects as in the first embodiment can be obtained. <Fourth Embodiment>

The first embodiment has exemplified the case in which contours are extracted based on the 8-neighboring connection concept in the labeling processing and contour extraction processing. However, the present invention is not limited to the 8-neighboring connection concept. That is, the present invention is applicable to a case in which the labeling processing and contour extraction processing are executed based on the 4-neighboring connection concept.

Figure 4:
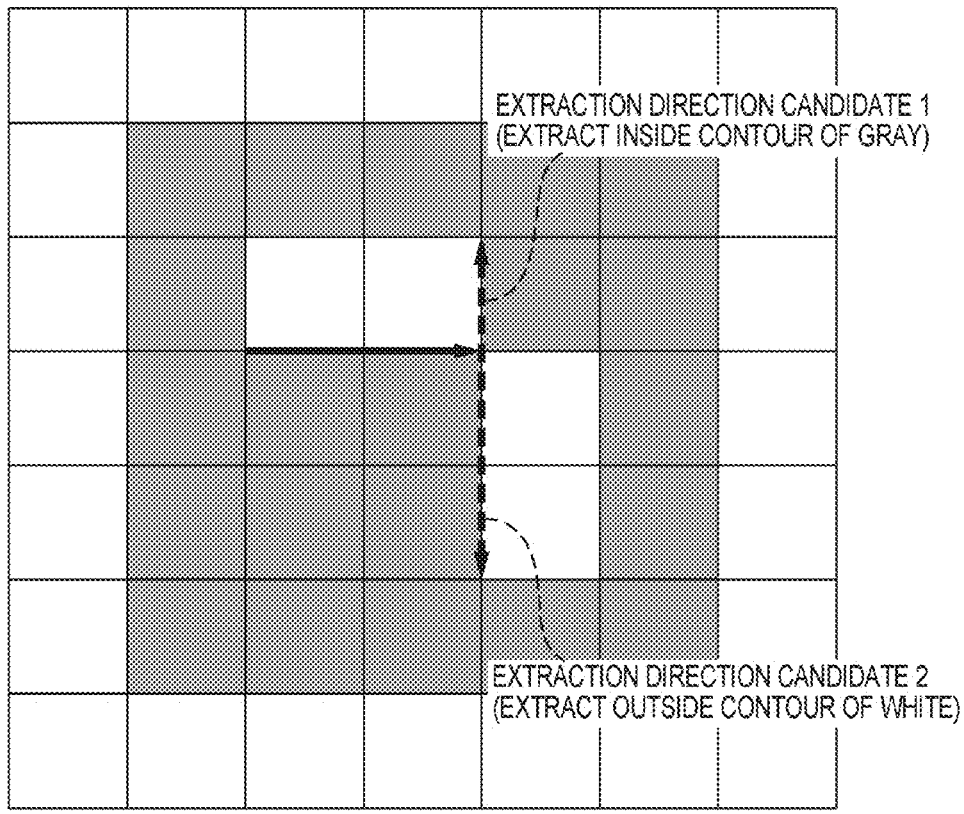
FIG. 4 is a view for explaining a problem in which a tracking direction cannot be settled during contour extraction.

When both outside and inside contours are to be extracted based on the 4-neighboring connection concept, if same color pixels are connected in only oblique directions, as in the example shown in FIG. 4, one inside contour of gray is extracted, and two outside contours of white are extracted, resulting in a mismatch of contour shapes. Hence, even when the labeling processing and contour extraction processing are executed based on the 4-neighboring connection concept, two conditions can be defined, that is, an intersection is judged upon extraction of each boundary line between intersections (1) when a window of a 2×2 pixel size includes three or more different color regions, and (2) when pixels in the oblique directions have the same color (and have different colors in the right and left directions and in the upper and lower directions) in the window of the 2×2 pixel size.

Thus, the same effects as in the first embodiment can be obtained.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-234012, filed Oct. 18, 2010, which is hereby incorporated by reference herein in its entirety.

What is claimed is:

1. An image processing apparatus comprising:
a contour extraction unit configured to extract contours of color regions, each of which includes continuous pixels having the same pixel value, in image data;
an intersection detection unit configured to detect, as an intersection, a point which satisfies one of a point at which not less than three different colors meet, and a point at which pixels which neighbor in oblique directions have the same color and pixels which neighbor in right and left directions and in upper and lower directions have different colors, in each of contours extracted by said contour extraction unit;
a division boundary line storage unit configured to store, in association with a contour in which the intersection is detected by said intersection detection unit, contours divided at the intersection as boundary lines;
a non-division boundary line storage unit configured to store, in association with a contour in which the intersection is not detected by said intersection detection unit, the contour as a boundary line without dividing the contour;
a function approximation unit configured to execute function approximation for each of boundary lines stored by said division boundary line storage unit and said non-division boundary line storage unit; and
a boundary line connection unit configured to reconstruct contours of the color regions using the boundary lines after the function approximation of said function approximation unit.

2. The apparatus according to claim 1, further comprising:
a region number assigning unit configured to assign region numbers to respective color regions, each of which includes continuous pixels having the same pixel value, in image data,
wherein said contour extraction unit extracts contours of the color region for each region number assigned by said region number assigning unit.

3. The apparatus according to claim 2, wherein said intersection detection unit detects, as the intersection, the point at which not less than three different colors meet, and the point at which pixels in oblique directions have the same color and pixels in right and left directions and in upper and lower directions have different colors, in each of contours extracted by said contour extraction unit, using the region number assignment result of said region number assigning unit.

4. The apparatus according to claim 1, wherein said intersection detection unit detects the intersection using a window having a 2×2 pixel size.

5. The apparatus according to claim 1, wherein said intersection detection unit detects the intersection to have, as a target, a pixel at a position of the contour extracted by said contour extraction unit.

6. The apparatus according to claim 1, wherein said division boundary line storage unit and said non-division boundary line storage unit control not to redundantly store the same boundary line, and store region reconstruction information required to identify boundary lines used when said boundary line connection unit reconstructs the contours.

7. The apparatus according to claim 1, wherein every time the contour extraction unit extracts a contour, said intersection detection unit detects the intersection for the extracted contour, and said division boundary line storage unit and said non-division boundary line storage unit store boundary lines.

8. The apparatus according to claim 1, wherein said contour extraction unit extracts outside contours of the respective color regions, processes of said intersection detection unit, said division boundary line storage unit, and said non-division boundary line storage unit are executed for the extracted outside contours, said contour extraction unit then extracts inside contours of the respective color regions, and the processes of said intersection detection unit, said division boundary line storage unit, and said non-division boundary line storage unit are executed for the extracted inside contours.

9. The apparatus according to claim 1, wherein said contour extraction unit extracts contours of color regions each including pixels which have the same pixel value and are connected based on an 8-neighboring connection concept.

10. The apparatus according to claim 1, wherein said contour extraction unit extracts contours of color regions each including pixels which have the same pixel value and are connected based on a 4-neighboring connection concept.

11. An image processing apparatus comprising:
a region number assigning unit configured to assign region numbers to color regions, each of which includes connected pixels having the same pixel value, in image data;
a contour extraction unit configured to extract contours of the color regions assigned the region numbers by specifying coordinate point sequences which define the contours;
an intersection detection unit configured to inspect positions of the contours extracted by said contour extraction unit, using a window having a 2×2 pixel size in an image assigned the region numbers by said region number assigning unit, and detects, as an intersection, one of a position at which not less than three different region numbers exist within the window, and a position at which only region numbers in oblique directions in the window are the same;
a boundary line extraction unit configured to extract, in association with a contour in which the intersection is detected by said intersection detection unit, contours divided at the intersection as boundary lines, and extracts a contour in which the intersection is not detected by said intersection detection unit as a boundary line without dividing the contour;
a function approximation unit configured to execute function approximation for each of boundary lines extracted by said boundary line extraction unit; and
a boundary line connection unit configured to reconstruct the contours of the color regions by connecting the boundary lines after the function approximation of said function approximation unit.

12. An image processing method comprising:
a contour extraction step of extracting contours of color regions, each of which includes continuous pixels having the same pixel value, in image data;
an intersection detection step of detecting, as an intersection, a point which satisfies one of a point at which not less than three different colors meet, and a point at which pixels which neighbor in oblique directions have the same color and pixels which neighbor in right and left directions and in upper and lower directions have different colors, in each of contours extracted in the contour extraction step;
a division boundary line storage step of storing, in association with a contour in which the intersection is detected in the intersection detection step, contours divided at the intersection as boundary lines;
a non-division boundary line storage step of storing, in association with a contour in which the intersection is not detected in the intersection detection step, the contour as a boundary line without dividing the contour;
a function approximation step of executing function approximation for each of boundary lines stored in the division boundary line storage step and the non-division boundary line storage step; and
a boundary line connection step of reconstructing contours of the color regions using the boundary lines after the function approximation in the function approximation step.

13. A non-transitory computer-readable medium storing a program for controlling a computer to function as: a contour extraction unit configured to extract contours of color regions, each of which includes continuous pixels having the same pixel value, in image data; an intersection detection unit configured to detect, as an intersection, a point which satisfies one of a point at which not less than three different colors meet, and a point at which pixels which neighbor in oblique directions have the same color and pixels which neighbor in right and left directions and in upper and lower directions have different colors, in each of contours extracted by said contour extraction unit; a division boundary line storage unit configured to store, in association with a contour in which the intersection is detected by said intersection detection unit, contours divided at the intersection as boundary lines; a non-division boundary line storage unit configured to store, in association with a contour in which the intersection is not detected by said intersection detection unit, the contour as a boundary line without dividing the contour; a function approximation unit configured to execute function approximation for each of boundary lines stored by said division boundary line storage unit and said non-division boundary line storage unit; and a boundary line connection unit configured to reconstruct contours of the color regions using the boundary lines after the function approximation of said function approximation unit.

* * * * *